UNITED STATES PATENT OFFICE

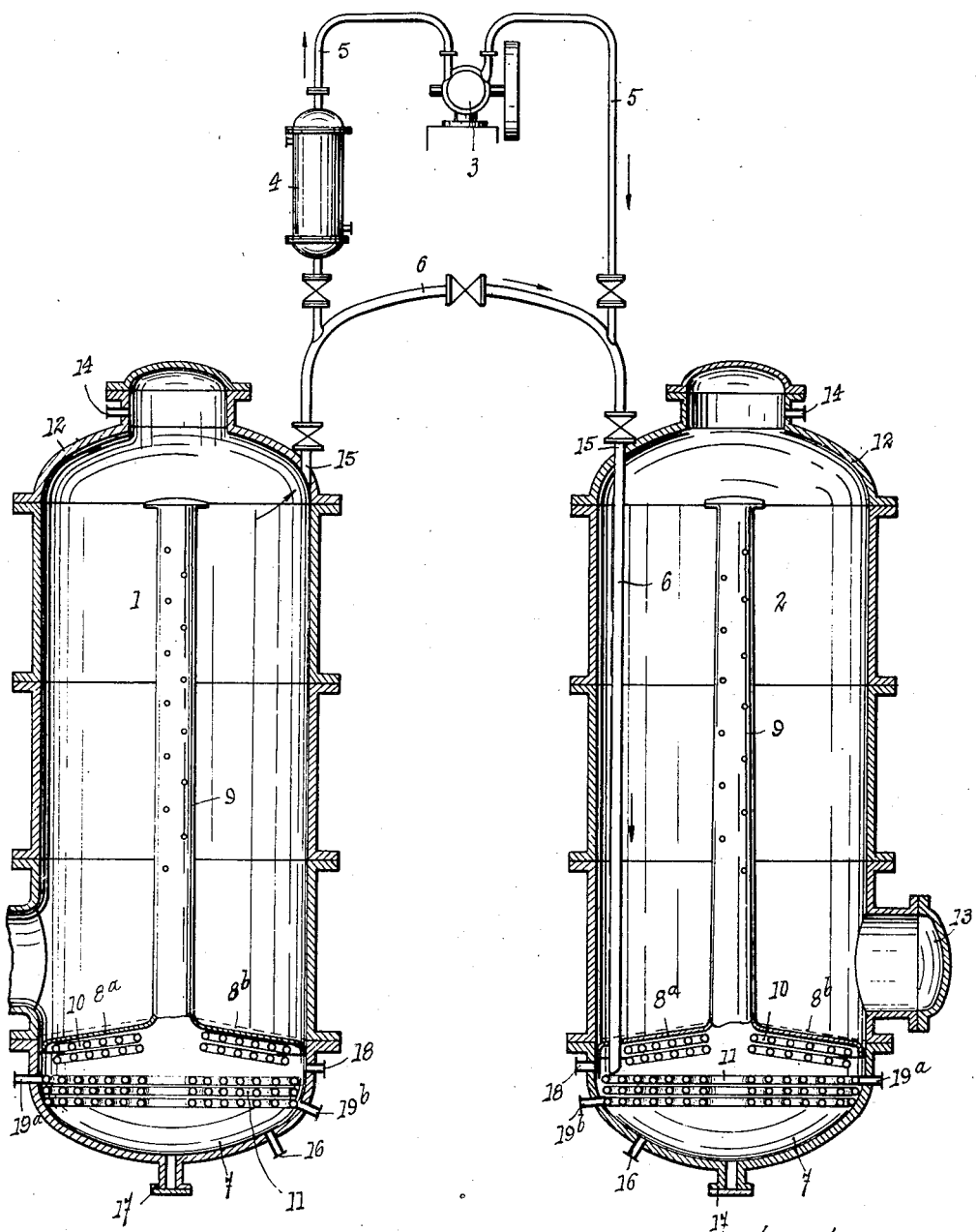

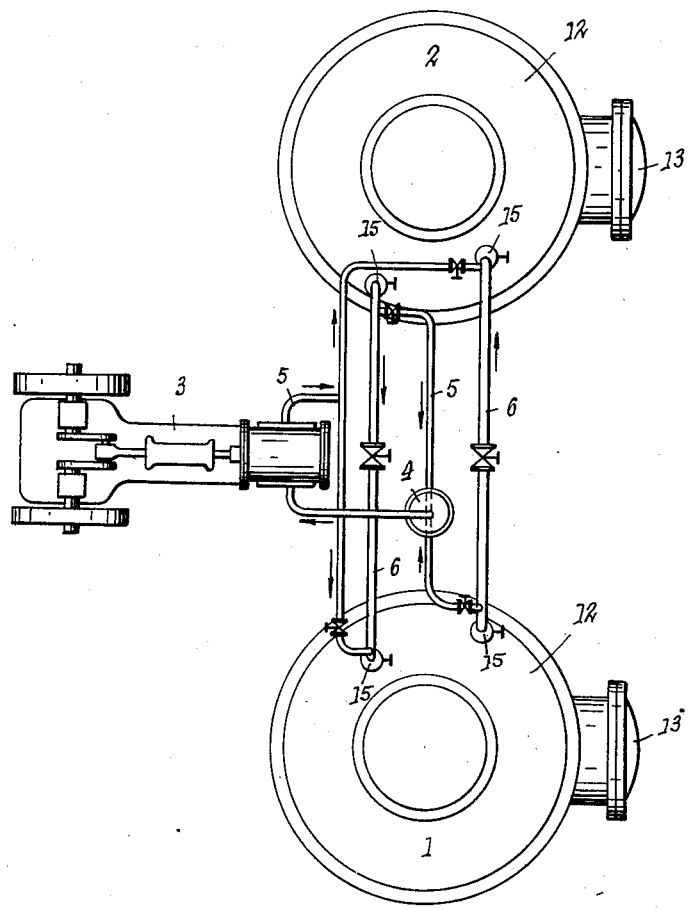
FIG_2

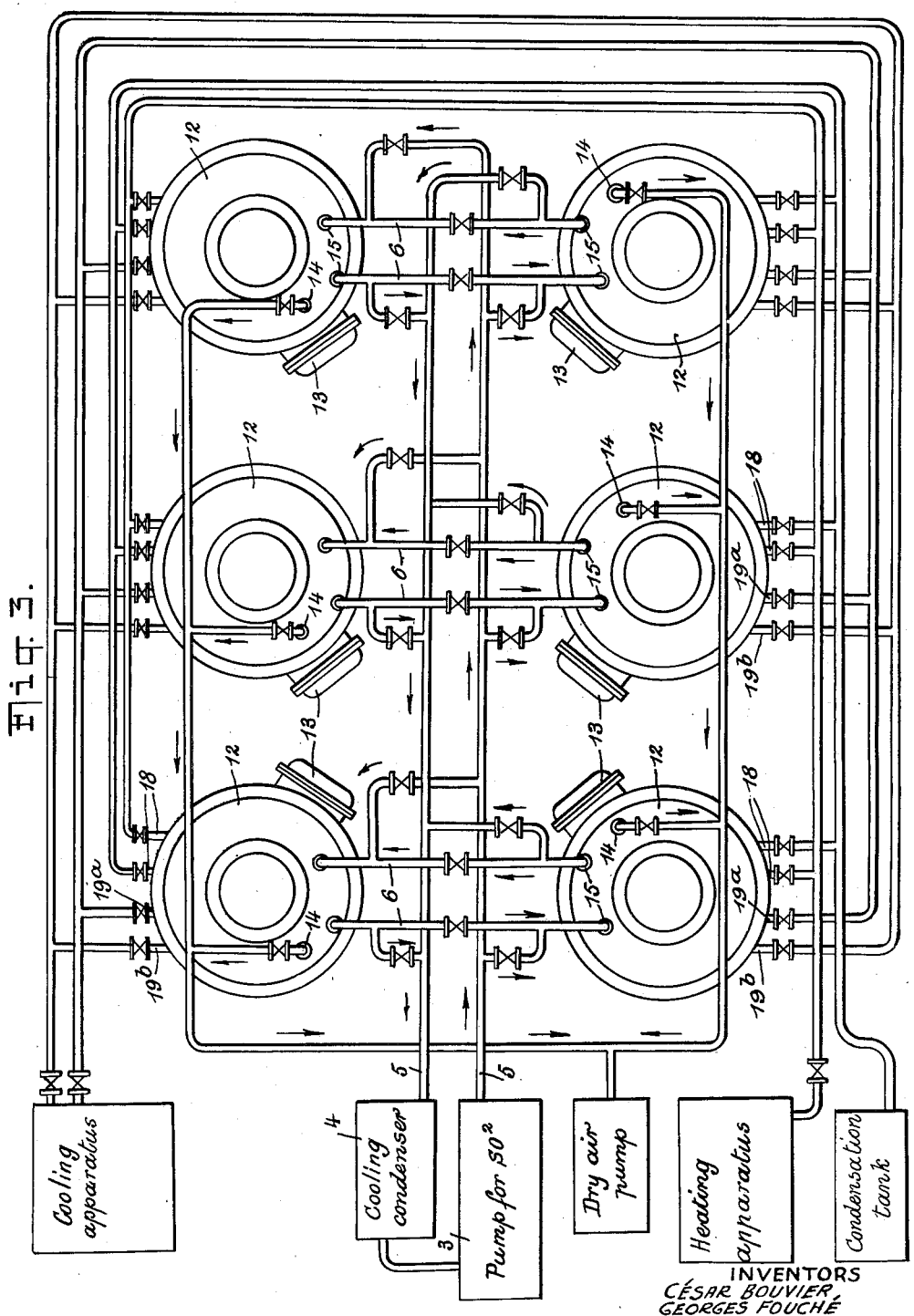

1,927,541

PROCESS AND PLANT FOR THE MANUFACTURE OF PURE CELLULOSE FROM VEGETABLE FIBERS

Cesar Bouvier, Paris, and Georges Fouché, La Fleche, and Edmond Seguin, La Courbe-le-Lude, France Application June 22, 1932, Serial No. 618,728, and in France July 1, 1931

5 Claims. (Cl. 92—11)

Numerous processes are in use for the manufacture of cellulose from vegetable fibers, based upon the treatment of ligneous fibers by caustic soda, sulphates or bisulphites. However, such processes have but a limited yield, and afford a cellulose of an inferior quality, and they will not permit the treatment of all vegetable substances by the same bath, being also expensive as a general rule. Attempts have been made to employ sulphurous anhydride gas for the disaggregation of ligneous fibers, but such processes cannot be practically employed on an industrial scale. They will not produce an entirely pure cellulose, and are not adapted for the full recovery of the sulphurous anhydride gas, and are thus expensive, being also attended with some danger when the apparatus is emptied, as the apparatus still contain a considerable amount of this gas.

The process, the subject-matter of the present invention, relates to the use of sulphurous anhydride for the extraction of pure cellulose from all vegetable fibers, and without preliminary treatment, with a much greater economy than is afforded by the known method. The sulphurous anhydride can be entirely recovered, thus obviating all danger due to the operations in the presence of a certain amount of this gas remaining in the apparatus.

The said process comprises the use, in the known manner, of two autoclaves or digesters adapted for alternate operation, wherein one autoclave contains ligneous material and water subjected to the action of the sulphurous anhydride, with suitable heating, and the second autoclave is being emptied, the same amount of sulphurous anhydride being successively employed in the two autoclaves.

The characteristic features of the invention consist in the fact that a vacuum is produced in the autoclave filled with ligneous substances, before the water is supplied to the same, and that the vacuum is also produced upon the water during its delivery therein; the lower part of the said autoclave into which the sulphurous anhydride is supplied from the other autoclave is subjected to an energetic cooling which is maintained during the whole time of this introduction, whereby the said sulphurous anhydride will be better dissolved, and the anhydride can also be recovered in an approved manner and without recourse to an auxiliary autoclave.

The material is preferably cooled by a circulation of cooling brine in a worm-tube mounted in a chamber which is formed at the lower part of each autoclave and is separated from the main body of the same, which chamber contains only the solution of the sulphurous anhydride.

In order to facilitate the extraction of the sulphurous anhydride from the autoclave engaged in the treatment, and to provide for its total recovery, it is preferable to use a condenser upon the piping of the apparatus which withdraws the sulphurous anhydride gas from one autoclave and delivers it into the other, and said condenser serves to cool the gas in circulation, thus furthering the suction of the gas.

The worm-tubes employed for the heating of the material during the cooking operation are preferably mounted in the said chambers situated at the lower part of the autoclaves.

The said invention is disclosed in the following description illustrated by the accompanying drawings.

Fig. 1 is a diagrammatic elevational view, with parts in section, of an apparatus embodying the said invention.

Fig. 2 is a diagrammatic view of a corresponding plant.

Fig. 3 is a plan view of a plant comprising several pairs of autoclaves.

In the form of construction shown in Figures 1 and 2, the apparatus embodying the said process comprises two autoclaves 1 and 2 which are adapted for alternate action, each of which consists of a stationary vertical cylinder of large capacity preferably of steel, and faced on the inner wall with an adherent lining of lead. Such cylinders will withstand a pressure of at least 15 kgs. per cm$^2$.

A pump compressor apparatus 3 operates with the autoclaves for the suction and delivery of the $SO_2$. The portion of the pump in contact with the gas should be made of a non-rusting metal; it should have a great cooling surface, and should operate with a vacuum of at least 650 mm. of mercury and a compression of at least 6 kgs. per cm$^2$.

A condenser 4 serves to cool the gas withdrawn from the autoclaves. A set of piping 5—6, provided with suitable cocks, serves for suction and delivery of the $SO_2$ for either of the autoclaves, and the cooling condenser may be used in the suction circuit; the two apparatus may also be connected together by the use of two pairs of pipes, and in each pair, one pipe extends to the lower chamber of one of the digesters, whilst the other is connected at the top of the other digester.

The apparatus further comprises a generator of units of cold by a suitable brine circulation (not shown), with the use of a pump. It also includes a generator of heat by the use of steam (not shown) for the cooking, whose temperature may vary between 90° and 110° C. according to the kind of wood to be treated and the rate at which the cooking is to be effected. A dry vacuum pump, known per se, is also employed.

At the bottom of each digester is a relatively small chamber 7, of which one side is formed by the lower wall of the digester and the upper side by a false bottom 8a consisting of a metal which has been made non-rusting, and it supports, at a very small distance, a second false bottom of a perforated non-rusting metal which serves as a support for the charge of fibers under treatment.

In each autoclave, these two false bottoms are pierced at the center with an aperture upon which is mounted a vertical conduit 9 which rises to the level of the bath. On the top of said conduit is a cap which allows the solution to pass through, but retains the fibers under treatment. These conduits are pierced with orifices for the circulation of the liquid.

In the lower chamber 7 of each autoclave is mounted a set of worm-tubes 10 of non-rusting metal, adapted for a steam circulation affording the heat necessary for the cooking as well as a set of worm tubes 11 of a like metal, adapted for the circulation of brine for the production of the cold required for the recovery of the $SO_2$. This chamber 7 is used exclusively for the solution, and thus a rapid heating or cooling effect can be obtained.

When the steam circulates in the worm-tubes, which are constructed in view of a surface of great efficacity, the liquid is rapidly heated, and this affords a strong upward circulation in the vertical conduit 9, and a strong downward circulation around the said conduit, whereby the whole mass will be rapidly heated.

On the contrary, when the cooling brine is circulated, only the chamber containing the worm-tubes need be cooled.

The upper part of each autoclave is closed by a bolted cover 12 which is of large size to permit the proper loading of the apparatus.

At the lower part of each autoclave is provided one or two large apertures closed by bolted covers 13, for the discharge of the fibers after the cooking. Along the cylindrical body of the apparatus are mounted level ganges, by which the operation can be suitably followed. The whole apparatus is covered with heat-insulating material.

Various necks are provided for connecting the autoclaves with the several parts of the plant, such as a neck 14 for connecting with the vacuum pump, a neck 15 for the $SO_2$ pump, a neck 16 for the water supply, a neck 17 for emptying, a neck 18 for the steam supply, and necks 19a, 19b for the cold brine supply.

The set of piping and cocks for the circulation is clearly shown in the drawings.

The cycle of operations is as follows.

After the fibers have been loaded into one of the digesters and the doors closed, the dry vacuum pump is operated in order to produce a vacuum in this digester. When the proper vacuum has been reached, the operator opens the connection between the autoclave and the water supply, while continuing to produce the vacuum, which is maintained for a few minutes after the connection has been closed and the water has reached its level. This vacuum serves in the first place to withdraw the air from the fibers and then the air dissolved in or brought over by the water, thus preventing subsequent combinations from being made. Concurrently with the opening of the water supply the operator opens the brine circulation in order to cool the water in the apparatus.

The vacuum having been formed and the water cooled, the operator supplies to the autoclave, by known means, the amount of $SO_2$ which has been prepared. The strength of the solution will be as great as desired—100 to 200 grams of $SO_2$ per liter of water—by reason of the arrangement of the autoclave.

In fact, the $SO_2$ is admitted at the lower part of the autoclave, in the relatively limited space, and around the cold brine worm-tube. The water contained in this space becomes much colder than the water in the other part of the apparatus, due to the fact that as the coldest water has the greatest density, and as the lower chamber is cut off to a great degree by the false bottoms supporting the charge, no movement of convection will take place, and hence the whole amount of cold produced by the worm-tube is confined to this lower chamber, hence the temperature at this point will soon become low enough to provide for a strong solution. All risk of freezing is obviated, due to the presence of $SO_2$.

When the proper amount of $SO_2$ has been introduced, the brine circulation is stopped, the worm-tube becomes emptied, and steam is supplied to the heating worm-tubes for the cooking, whose duration depends upon the nature of the fibers under treatment, the strength of the solution and the temperature. It is possible to reach a pressure of 12 kgs. per $cm^2$ and a temperature of 110° C. in order to perform the cooking operation in four hours, without inconvenience as regards the purity of the cellulose or the strength of the apparatus which have been constructed for the purpose.

When the cooking operation has been completed, it is then resuired to proceed with the recovery of the $SO_2$, and the whole of the $SO_2$ used in the cooking operation which is now completed, is circulated into the second autoclave, in which it acts to decompose the material, then returning to the first, and so on for a great number of operations.

In the first place, this second autoclave is subject to the same preliminary preparations as described for the first, that is, loading with the fibers, vacuum, water supply brine circulation, vacuum. These different preparatory operations are commenced at the proper time during the cooking in the first autoclave, so that the recovery may commence when the brine circulation has once exercised its cooling action.

At this time, the operator opens the upper connection between the two autoclaves; the connecting pipe leads from the top of the first autoclave to the bottom of the second, and into the lower free space filled with liquid, surrounding the cold brine worm-tube. Due to the pressure prevailing in the first autoclave and to the cold and the vacuum in the second, the gas flows rapidly into this latter and is soon dissolved.

During this time the cold brine is constantly in circulation, and it absorbs the heat from the hot gas and from the heated solution. In a few moments the greater part of the $SO_2$ gas and a small amount of water vapour has circulated from the first to the second autoclave. The pressures thus become balanced. Then follows the effective recovery of the $SO_2$ by means of the compressor used for this gas, whereby all the $SO_2$ remaining in the first autoclave is removed. For this purpose, the operator closes the connection at the middle of the piping, and then sets the compressor-pump in operation, and opens the valves for the suction and delivery. The compressor, which is mounted in a branch circuit between the two autoclaves, withdraws through the aforesaid cooler from the first autoclave and delivers by pressure into the second autoclave and around the brine worm-tube, and thus the pressure will fall in a very short time, and the vacuum is produced in the first autoclave, whilst under the action of the cold the pressure has remained almost constant in the second autoclave.

Under the influence of the vacuum, the $SO_2$ cannot remain dissolved in the water, and it circulates entirely from the first autoclave to the second, and hence this second autoclave is entirely provided for another cooking operation. It is simply necessary to close off the upper connections to stop the pump-compressor apparatus and to circulate the steam, after stopping the brine circulation, in order to commence another operation.

During the coooking operation, the first autoclave is discharged and its contents placed apart, and it is again filled and the same cycle of operations is continued.

The crude cellulose thus obtained is first washed in hot water for the final removal of the organic substances surrounding the fibers. This hot water can be economically obtained by circulating, through a heating and cooling apparatus, the hot water charged with dissolved organic substances pertaining to the autoclave in which the cooking has just been completed.

The cellulose is then subjected to the various manipulations depending upon the use which is to be made of the same.

The said process is adapted for the treatment of all varieties of wood or plants whether of a hard or resinous nature and of all ages, for instance bamboo, dwarf-palm, alfa or straw of all kinds, cut fine and macerated in water, and in general, all ligneous or fibrous substances.

The said plant may comprise several pairs of autoclaves which are operated as herein disclosed, as shown in Figure 3 of the drawings.

Obviously, the invention is not limited to the forms of construction hereinbefore specified, and various other forms of apparatus may be employed.

We claim:

1. A process for the manufacture of cellulose by the use of all varieties of vegetable fibers, comprising the use of sulphurous anhydride in the known manner for the disaggregating of such fibers in two autoclaves adapted for alternate functioning, which process provides for the manufacture of pure cellulose, with the total recovery of the sulphurous anhydride, characterized by the fact that a vacuum is produced in the autoclave which has just been filled with ligneous material, and before the water has been supplied, the vacuum being also produced upon the water during its delivery, and that the lower part of the said autoclave into which the sulphurous anhydride is supplied from the other autoclave is subjected to an energetic cooling which is maintained during the whole time of this introduction whereby the said sulphurous anhydride will be better dissolved and the anhydride can also be recovered in an approved manner and without recourse to an auxiliary autoclave.

2. An apparatus embodying the process claimed in claim 1, characterized by the fact that each of the autoclaves comprises at the lower part a chamber which is separated from the main chamber and in which is exclusively circulated the sulphurous anhydride solution, and further comprises a vertical conduit connecting the said chamber with the upper part of the autoclave, said chamber containing a steam worm-tube affording the heat required for the cooking as well as a worm tube adapted for a cold brine circulation adapted for cooling purposes.

3. A plant as claimed in claim 2, characterized by the fact that a cooling condenser is mounted in the suction circuit between the pump-compresser set adapted for the recovery, and the autoclaves, which condenser is adapted to cool the gas and to facilitate the withdrawal of the sulphurous anhydride from the autoclave.

4. A plant as claimed in claim 2, characterized by the fact that it comprises two autoclaves provided at their lower parts with worm-tube chambers, a pump for sulphurous anhydride, a cooling condenser, a set of piping, with cocks, which is adapted for suction and delivery for either of the autoclaves, by which the cooling condenser may be mounted in the suction circuit and the two autoclaves may be connected together, a cooling apparatus, a heating apparatus and a dry vacuum pump of a known type.

5. An apparatus as claimed in claim 2, characterized in that it comprises several pairs of autoclaves.

CESAR BOUVIER.
GEORGES FOUCHÉ.
EDMOND SEGUIN.